United States Patent
Lv et al.

(10) Patent No.: US 9,439,016 B2
(45) Date of Patent: Sep. 6, 2016

(54) INFORMATION DISPLAY METHOD, INFORMATION DISPLAY DEVICE, AND DISPLAY APPARATUS

(71) Applicants: BOE TECHNOLOGY GROUP CO., LTD., Beijing (CN); Beijing BOE Vision-Electronic Technology Co., Ltd., Beijing (CN)

(72) Inventors: Bendeng Lv, Beijing (CN); Min Chen, Beijing (CN)

(73) Assignees: BOE TECHNOLOGY GROUP CO., LTD., Beijing (CN); Beijing BOE Vision-Electronic Technology Co., Ltd., Beijing (CN)

( * ) Notice: Subject to any disclaimer, the term of this patent is extended or adjusted under 35 U.S.C. 154(b) by 52 days.

(21) Appl. No.: 14/444,483

(22) Filed: Jul. 28, 2014

(65) Prior Publication Data
US 2015/0230038 A1    Aug. 13, 2015

(30) Foreign Application Priority Data
Feb. 7, 2014   (CN) .......................... 2014 1 0044799

(51) Int. Cl.
| H04R 29/00 | (2006.01) |
| H04R 1/02 | (2006.01) |
| H04R 3/00 | (2006.01) |
| G06F 3/16 | (2006.01) |

(52) U.S. Cl.
CPC .............. *H04R 29/008* (2013.01); *H04R 3/00* (2013.01); *G06F 3/165* (2013.01); *H04R 2430/01* (2013.01); *H04R 2499/11* (2013.01); *H04R 2499/15* (2013.01)

(58) Field of Classification Search
CPC .................................................... H04R 29/008
USPC ............................................................ 381/56
See application file for complete search history.

(56) References Cited

U.S. PATENT DOCUMENTS 5,553,220 A * 9/1996 Keene ....................... G06F 3/16
                                                                 345/520
5,826,044 A * 10/1998 Zenda ....................... G06F 3/14
                                                                 348/E5.108

(Continued)

FOREIGN PATENT DOCUMENTS

| CN | 1601457 A | 3/2005 |
| CN | 1968543 A | 5/2007 |
| CN | 101163215 A | 4/2008 |

OTHER PUBLICATIONS

First Chinese Office Action (including English translation) dated Mar. 10, 2016, for corresponding Chinese Application No. 201410044799.4.

*Primary Examiner* — Khai N Nguyen
(74) *Attorney, Agent, or Firm* — Kinney & Lange, P.A.

(57) ABSTRACT

An information display method, an information display device, and a display apparatus are disclosed in the embodiments of the present invention. Sound information is acquired, and the acquired sound information is sent to the sound control register such that the sound control register obtains a corresponding sound control register value according to the sound information, the display information is obtained according to the sound control register value, and the display information is displayed. With the method according to the embodiment of the present invention, the sound information can be displayed, thereby improving user's usage perception.

19 Claims, 2 Drawing Sheets

(56) References Cited

U.S. PATENT DOCUMENTS

| | | | | |
|---|---|---|---|---|
| 5,831,448 | A * | 11/1998 | Kean | G06F 17/5054 326/40 |
| 6,138,198 | A * | 10/2000 | Garnett | G06F 11/1641 710/311 |
| 6,263,396 | B1 * | 7/2001 | Cottle | G09G 5/14 348/E11.021 |
| 6,369,855 | B1 * | 4/2002 | Chauvel | G09G 5/14 348/423.1 |
| RE39,510 | E * | 3/2007 | Agrawal | H03K 19/17728 326/38 |
| 7,515,072 | B2 * | 4/2009 | Borisavljevic | H03M 3/506 341/142 |
| 8,032,353 | B1 * | 10/2011 | Baron | G06F 9/45558 703/24 |
| 2002/0059180 | A1 | 5/2002 | Aoki et al. | |
| 2003/0123680 | A1 | 7/2003 | Lee et al. | |
| 2004/0075745 | A1 * | 4/2004 | Mance | H04N 21/854 348/207.1 |
| 2004/0117825 | A1 * | 6/2004 | Watkins | H04N 5/782 725/40 |
| 2005/0132397 | A1 * | 6/2005 | Moon | G06T 11/206 725/18 |
| 2005/0192685 | A1 * | 9/2005 | Puckette | H04R 3/00 700/94 |
| 2006/0247995 | A1 * | 11/2006 | Childs | G06Q 40/00 705/35 |
| 2006/0253628 | A1 * | 11/2006 | Chan | G06F 1/3287 710/62 |
| 2007/0197291 | A1 * | 8/2007 | Shimizu | A63F 13/02 463/36 |
| 2010/0189104 | A1 * | 7/2010 | Ichimura | G09G 5/008 370/389 |
| 2010/0205412 | A1 * | 8/2010 | McLeod | G06F 3/162 712/225 |
| 2011/0019086 | A1 * | 1/2011 | Almeida | H04N 5/765 348/453 |
| 2012/0200771 | A1 * | 8/2012 | Almeida | H04N 5/765 348/453 |
| 2012/0320807 | A1 * | 12/2012 | Yew | H04M 1/72527 370/286 |
| 2013/0027315 | A1 * | 1/2013 | Teng | G06F 3/0488 345/173 |
| 2013/0201397 | A1 * | 8/2013 | Ayoub | H04R 5/04 348/515 |
| 2014/0218379 | A1 * | 8/2014 | Jia | G06T 1/20 345/520 |
| 2014/0240331 | A1 * | 8/2014 | Norton | G09G 5/006 345/520 |
| 2014/0266995 | A1 * | 9/2014 | Cho | G09G 3/3607 345/88 |
| 2015/0043737 | A1 * | 2/2015 | Abe | G10L 25/48 381/56 |
| 2015/0373402 | A1 * | 12/2015 | Zimmeri | H04N 21/214 725/59 |

* cited by examiner

INFORMATION DISPLAY METHOD, INFORMATION DISPLAY DEVICE, AND DISPLAY APPARATUS

CROSS-REFERENCE TO RELATED APPLICATION

This application claims the benefit of Chinese Patent Application No. 201410044799.4 filed on Feb. 7, 2014 in the State Intellectual Property Office of China, the whole disclosure of which is incorporated herein by reference.

BACKGROUND OF THE INVENTION

1. Field of the Invention

Embodiments of the present invention relate to the field of display, and particularly to an information display method, an information display device, and a display apparatus.

2. Description of the Related Art

With continual improvement of display technique, the people's requirements for a large size and definition of a display are also rising. The technique of ultrahigh definition (UD) for higher display resolution has been developed as required and has been gradually liked by more and more people. Compared with the conventional high definition (HD) display technique and the full HD display technique, generally the physical resolution of the UD display apparatus can reach 3840×2160 (4K×2K) or more, and the total pixel number of the UD display apparatus reaches eight millions or more and is eight times as large as that of the HD (a physical resolution of 1366×768) display apparatus which is prevailing on the market currently and four times as large as that of the full HD (a physical resolution of 1920×1080) display apparatus.

Generally, the UD display apparatus adopts a digital visual interface (DVI) channel for transmitting ultrahigh definition image information. Specifically, in the DVI channel, 4K2K image information inputted into a display screen is generally from the four DVIs on a field-programmable gate array (FPGA) board. However, the DVI channel cannot transmit sound information. Generally, the sound information is acoustically inputted by a video graphics array (VGA) of a system on chip (SOC). Unlike that under the SOC, there is no sound operation indicating box under the DVI channel. Therefore, when the sound information is adjusted, it is difficult to visually observe a change of the sound information on the display screen, thereby seriously affecting user's usage perception.

SUMMARY OF THE INVENTION

According to embodiments of the present invention, there is provided an information display method, an information display device, and a display apparatus, to display the sound information.

In accordance with an embodiment of the present invention, there is provided an information display method comprising steps of:

acquiring sound information;

sending the acquired sound information to a sound control register such that the sound control register obtains a corresponding sound control register value according to the sound information;

obtaining display information according to the sound control register value; and displaying the display information.

In accordance with an embodiment of the present invention, there is also provided an information display device comprising:

a sound information acquiring module for acquiring sound information;

a sound information sending module for sending the acquired sound information to a sound control register, the sound control register for obtaining a corresponding sound control register value according to the sound information;

a display processing module for obtaining display information according to the sound control register value; and a display generation module for displaying the display information.

In accordance with a further embodiment of the present invention, there is also provided a display apparatus comprising the abovementioned information display device.

DETAILED DESCRIPTION OF THE EMBODIMENTS

Figure 1:
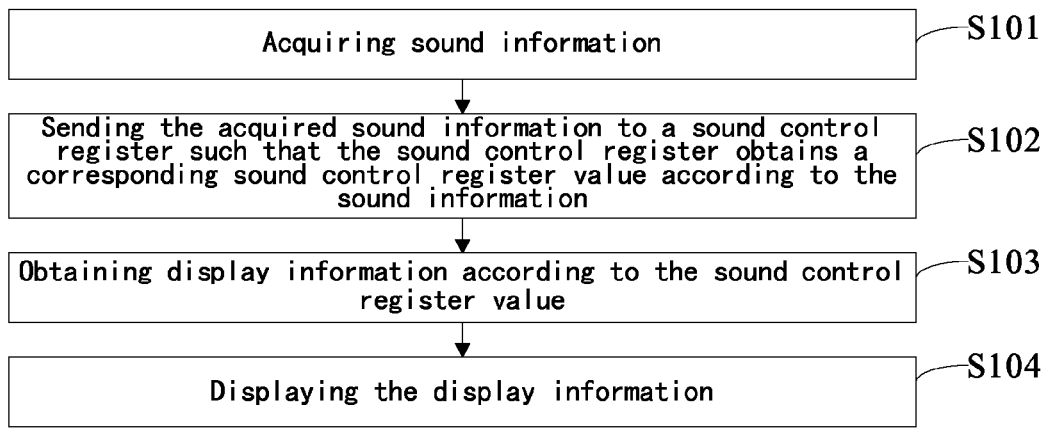
FIG. 1 is a schematic flow diagram of an information display method according to an embodiment of the present invention.

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present invention, there is provided an information display method comprising steps of:

acquiring sound information;

sending the acquired sound information to a sound control register such that the sound control register obtains a corresponding sound control register value according to the sound information;

obtaining display information according to the sound control register value; and displaying the display information.

According to a general concept of the present invention, there is also provided an information display device comprising:

a sound information acquiring module for acquiring sound information;

a sound information sending module for sending the acquired sound information to a sound control register, the sound control register for obtaining a corresponding sound control register value according to the sound information;

a display processing module for obtaining display information according to the sound control register value; and a display generation module for displaying the display information.

According to an general concept of the present invention, there is further provided an information display apparatus comprising the abovementioned information display device.

With the information display method, the information display device, and the display apparatus according to the embodiments of the present invention, sound information is acquired, and the acquired sound information is sent to a sound control register such that the sound control register can obtain a corresponding sound control register value according to the sound information, and thus display information for displaying is obtained according to the sound control register value. With such an information display method, the sound information can be written into the sound control register through a data bus so that the display information corresponding to the sound information can be transmitted through an image information interface, thereby displaying change of the sound information in real time, greatly facilitating control of the sound, and further consummating the function of the display apparatus.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, an information display method according to an embodiment of the present invention comprises the following steps.

At step 101, to acquire sound information.

The sound information may comprise various types of sound information. For example, the sound information may comprise a volume value of a sound or a change value of the volume; or may comprise information such as a frequency value or the number of sound channels of the sound. The sound information is not limited to any specific information. The sound information may be from a preset sound, or a volume adjusting information inputted by a user.

At step 102, to send the acquired sound information to a sound control register such that the sound control register obtains a corresponding sound control register value according to the sound information.

In some embodiments, the sound control register may specifically comprise a field-programmable gate array (FPGA) register.

At step 103, to obtain display information according to the sound control register value.

At step 104, to display the display information.

Specifically, the sound information can be written into the sound control register through the data bus so as to achieve transmission of the sound information in the DVI channel. By modifying the sound control register value, the display processing module can call a sound information displaying interface by reading change of the sound control register value, when the sound information is displayed.

With the information display method according to the embodiment of the present invention, sound information is acquired, and the acquired sound information is sent to the sound control register such that the sound control register can obtain the corresponding sound control register value according to the sound information, and thus the display information for displaying is obtained according to the sound control register value. With such an information display method, the sound information can be written into the sound control register through a data bus so that the display information corresponding to the sound information can be transmitted through an image information interface, thereby displaying change of the sound information in real time, greatly facilitating control of the sound, and further consummating the function of the display apparatus.

Figure 2:
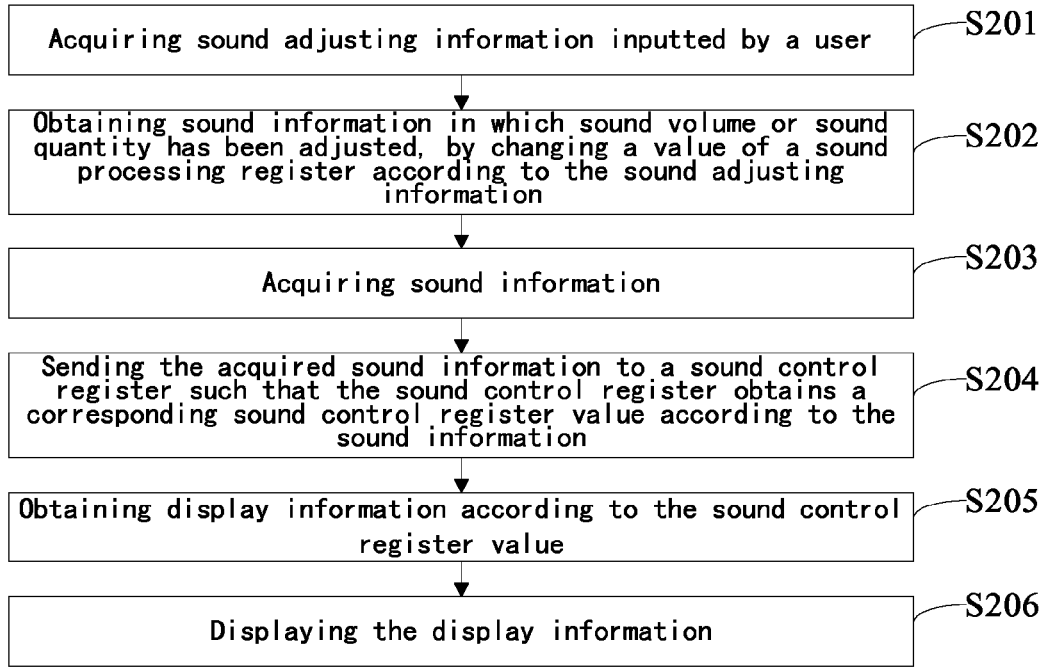
FIG. 2 is a schematic flow diagram of another information display method according to another embodiment of the present invention.

During actual use of a 4k2k intelligent television, the information display method according to the embodiments of the present invention can also be adopted to display the sound information. Specifically, as shown in FIG. 2, the information display method according to the embodiment of the present invention may further comprise the following steps.

At step 201, to acquire sound adjusting information inputted by a user.

The sound adjusting information may comprise at least one of various types of sound adjusting information such as volume adjusting information, sound channel setting information or tone quality adjusting information. Specifically, a user can input the sound adjusting information into a TV by various means such as infrared ray remote control, touch control or acoustic control. According to the present invention, it is not limited to any specific means.

At step 202, to obtain sound information in which sound volume or sound quantity has been adjusted by changing a value of a sound processing register according to the sound adjusting information.

For example, for adjustment of the volume, a table of correspondence relationship between register values and sound volumes may be preset in the sound processing register. The value of the sound processing register is changed by writing the volume adjusting information included in the sound adjusting information into the sound processing register, thereby adjusting the volume of the TV.

At step 203, to acquire the sound information.

At step 204, the acquired sound information is sent to a sound control register such that the sound control register obtains a corresponding sound control register value according to the sound information.

Specifically, a sound data package can be obtained according to the acquired sound information. The sound data package comprises sound information, a device address of a data bus of the sound control register and a register address of the data bus of the sound control register.

In some embodiments, an inter-integrated circuit (IIC) may be specifically adopted for the data bus.

The sound data package can be sent to the sound control register through the data bus such that the sound control register value corresponding to the register address is modified. The sound information is written into the sound control register through the data bus so as to achieve transmission of the sound information in the DVI channel.

At step 205, to obtain display information according to the sound control register value.

For example, when the display processing module reads that the sound control register value is changed, the display processing module can correspondingly call a sound displaying interface information. The sound displaying interface information may comprise information such as a current sound progress bar obtained according to the sound control register value.

Specifically, adjustment of the volume is taken as an example. When the display processing module reads that the sound control register value increases, it can correspondingly call the sound displaying interface information. The sound displaying interface information comprises a progress bar representing quantity of the volume. If the sound control register value increases continuously, a user can visually see continuous change of the progress bar representing the quantity of the volume. The present invention is not limited to the above embodiment. The frequency or the number of sound channels of the sound may also be displayed as the sound control register value. In the present invention, the displayed sound information is not limited to any specific sound information.

At step 206, to display the display information.

With such an information display method, the sound information can be written into the sound control register through the data bus so that the display information corresponding to the sound information can be transmitted through the image information interface, thereby displaying change of the sound information in real time.

Figure 3:
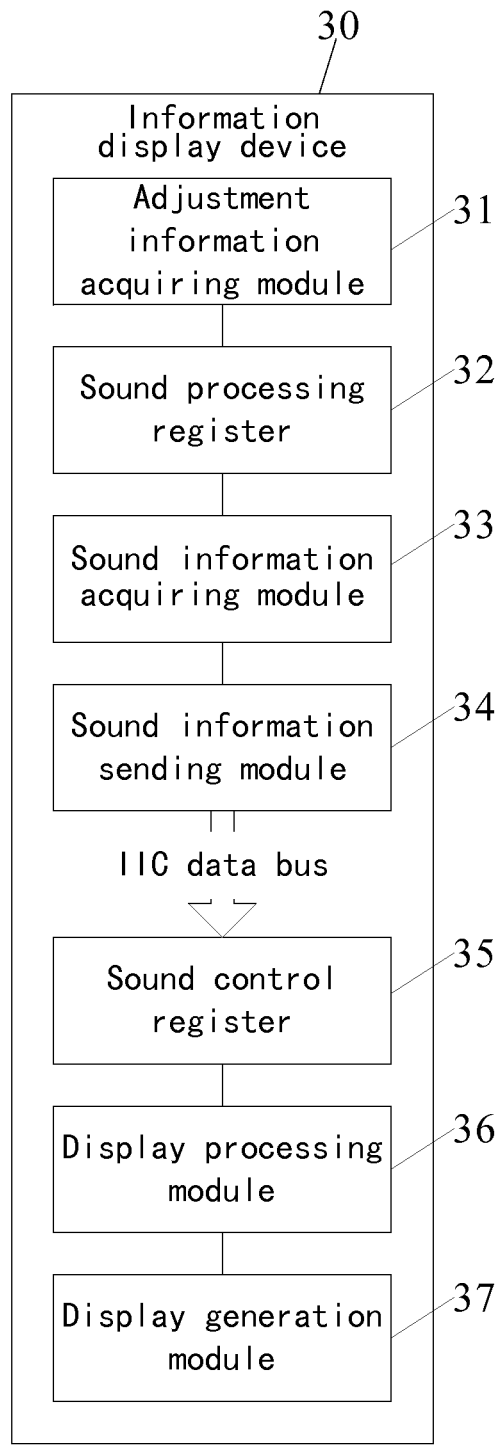
FIG. 3 is a schematic diagram showing configuration of an information display device according to an embodiment of the present invention.

As shown in FIG. 3, an information display device 30 according to an embodiment of the present invention comprises:

a sound information acquiring module 33 for acquiring sound information.

The sound information may comprise various types of sound information. For example, the sound information may comprise a volume value, or a change value of the volume of the sound; or may comprise information such as a frequency value or the number of sound channels of the sound. In the present invention, the sound information is not limited to any specific information. The sound information may be from a preset sound, or a volume adjusting information inputted by a user.

The information display device 30 further comprises a sound information sending module 34 for sending the acquired sound information to a sound control register 35.

Specifically, the sound information sending module 34 is further configured to obtain a sound data package according to the acquired sound information. The sound data package may comprise sound information, a device address of a data bus of the sound control register 35 and a register address of the data bus of the sound control register 35. In this way, the sound data package can be sent to the sound control register 35 through the data bus such that the sound control register value corresponding to the register address is modified.

The sound control register 35 is configured to obtain a corresponding sound control register value according to the sound information.

The information display device 30 further comprises a display processing module 36 for obtaining display information according to the sound control register value.

Specifically, the display processing module 36 may be further configured to call a sound displaying interface information when the sound control register value is changed. The sound displaying interface information may comprise a current sound progress bar obtained according to the sound control register value.

The information display device 30 further comprises a display generation module 37 for displaying the display information.

With the information display device according to the embodiment of the present invention, sound information is acquired, and the acquired sound information is sent to the sound control register such that the sound control register can obtain the corresponding sound control register value according to the sound information, and thus the display information for displaying is obtained according to the sound control register value. With such an information display method, the sound information can be written into the sound control register through a data bus so that the display information corresponding to the sound information can be transmitted through an image information interface, thereby displaying change of the sound information in real time, greatly facilitating control of the sound, and further consummating the function of the display apparatus.

In addition, as shown in FIG. 3, the information display device 30 may further comprise:

an adjustment information acquiring module 31 for acquiring sound adjusting information inputted by a user.

The sound adjusting information may comprise at least one of various types of sound adjusting information such as volume adjusting information, sound channel setting information or tone quality adjusting information. Specifically, a user can input the sound adjusting information into a TV by various means such as infrared ray remote control, touch control or acoustic control. According to the present invention, it is not limited to any specific means.

The information display device 30 may further comprise a sound processing register 32 for obtaining sound information in which sound volume or sound quantity has been adjusted, by changing a value of the sound processing register 32 according to the sound adjusting information.

For example, for adjustment of the volume, a table of correspondence relationship between register values and sound volumes may be preset in the sound processing register. The value of the sound processing register is changed by writing the volume adjusting information included in the sound adjusting information into the sound processing register, thereby adjusting the volume of the TV.

During actual use of a 4k2k intelligent television, the information display method according to the embodiments of the present invention can also be adopted to display the sound information. Specifically, referring to FIG. 3, the information display device 30 according to the embodiment of the present invention can achieve displaying of the sound information as follows.

The adjustment information acquiring module 31 acquires sound volume increasing or decreasing information inputted from a key or a remote controller by a user, and converts a key value into a software instruction. The software instruction performs on the sound processing register 32, and the sound processing register 32 adjusts the level of the sound volume of the TV by changing the value of the register.

In this case, the sound information acquiring module 33 acquires current actual sound information data by reading the value of the sound processing register 32, and the current sound information is written into the FPGA sound control register 35 by the sound information sending module 34. Specifically, the sound information sending module 34 can package the current sound data as an instruction having the device address of the FPGA IIC and the register address of the FPGA IIC, and then send the instruction to the FPGA sound control register 35 through the IIC data bus, thereby completing modification to the FPGA sound control register 35. For example, the current sound is xy. If the current sound data needs to be written into 0x0034 (the register address of the IIC) of 0x70 (the device address of the FPGA IIC), the current sound data may be packaged as {0x00, 0x00, 0x0x, 0x0y }, to achieve writing of the current sound data.

The FPGA display processing module 36 calls a sound displaying interface by reading change of the value of the FPGA sound control register 35 so that the current sound progress bar is displayed according to the value of the FPGA sound control register 35. Such displaying is achieved by the display generation module 37.

With such an information display method, the sound information can be written into the sound control register through the data bus so that the display information corresponding to the sound information can be transmitted through the image information interface, thereby achieving transmission of the sound information in the DVI channel, and displaying change of the sound information in real time.

Furthermore, a display apparatus according to an embodiment of the present invention comprises the abovementioned information display device 30.

It should be noted that the display device according to the embodiment of the present invention may comprise any product or parts having display function, such as a liquid crystal panel, an electronic paper, an OLED panel, a liquid crystal TV, a liquid crystal display, a digital frame, a mobile phone, and a tablet computer.

The configuration of the information display device 30 has been described in the above embodiments in detail and thus is no longer described for the sake of brevity.

The information display apparatus according to the embodiment of the present invention comprises the information display apparatus. With the information display device according to the embodiment of the present invention, sound information is acquired, and the acquired sound information is sent to the sound control register such that the sound control register can obtain a corresponding sound control register value according to the sound information, and thus the display information for displaying is obtained according to the sound control register value. With such an information display method, the sound information can be written into the sound control register through a data bus so that the display information corresponding to the sound information can be transmitted through an image information interface, thereby displaying change of the sound information in real time, greatly facilitating control of the sound, and further consummating the function of the display apparatus.

Those skilled in the art will recognize that all or some of the steps achieving the above method according to the embodiment of the present invention can be performed by instructing a relevant hardware by a computer program. The program can be stored in a computer-readable storage medium comprising various mediums that can store program codes such as a ROM, a RAM, a disk or an optical disc. When the program is executed, the steps of the above method according to the embodiment of the present invention are performed.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

The invention claimed is:

1. An information display method for a display apparatus, the display apparatus having a Digital Visual Interface (DVI) channel, the DVI channel having DVIs and a field-programmable gate array, the field-programmable gate array being configured to transmit image information and having a sound control register, the method comprising steps of:
   acquiring sound information of the display apparatus;
   sending the acquired sound information to the sound control register such that the sound control register obtains a corresponding sound control register value according to the acquired sound information;
   obtaining display information according to the sound control register value; and
   displaying the display information.

2. The information display method of claim 1, wherein:
the step of sending the acquired sound information to a sound control register comprises steps of:
obtaining a sound data package according to the acquired sound information, the sound data package comprising the acquired sound information, a device address of a data bus of the sound control register and a register address of the data bus of the sound control register; and
sending the sound data package to the sound control register through the data bus such that the sound control register value corresponding to the register address is modified.

3. The information display method of claim 2, wherein:
the step of obtaining the display information according to the sound control register value comprises a step of:
calling a sound displaying interface information when the sound control register value is changed, and
the sound displaying interface information comprises a current sound progress bar obtained according to the sound control register value.

4. The information display method of claim 2, wherein:
the step of obtaining the display information according to the sound control register value comprises a step of:
calling a sound displaying interface information when the sound control register value is changed.

5. The information display method of claim 1, wherein:
the method further comprises steps of: before the step of acquiring the sound information,
acquiring sound adjusting information inputted by a user; and
obtaining adjusted sound information in which sound volume or sound quantity has been adjusted, by changing a value of a sound processing register according to the sound adjusting information.

6. The information display method of claim 2, wherein:
the method further comprises steps of: before the step of acquiring the sound information,
acquiring sound adjusting information inputted by a user; and
obtaining adjusted sound information in which sound volume or sound quantity has been adjusted, by changing a value of a sound processing register according to the sound adjusting information.

7. The information display method of claim 3, wherein:
the method further comprises steps of: before the step of acquiring the sound information,
acquiring sound adjusting information inputted by a user; and
obtaining adjusted sound information in which sound volume or sound quantity has been adjusted, by changing a value of a sound processing register according to the sound adjusting information.

8. The information display method of claim 1, wherein:
the method further comprises steps of: before the step of acquiring the sound information,
acquiring sound adjusting information inputted by a user; and
obtaining adjusted sound information in which sound has been adjusted, by changing a value of a sound processing register according to the sound adjusting information.

9. The information display method of claim 2, wherein:
the field-programmable gate array comprises an inter-integrated circuit, and the data bus comprises an inter-integrated circuit data bus.

10. An information display device for a display apparatus, the display apparatus having a Digital Visual Interface (DVI) channel, the DVI channel having DVIs and a field-programmable gate array, the field-programmable gate array being configured to transmit image information and having a sound control register, the information display device comprising:
- a sound information acquiring module for acquiring sound information of the display apparatus;
- a sound information sending module for sending the acquired sound information to the sound control register, the sound control register being configured for obtaining a corresponding sound control register value according to the acquired sound information;
- a display processing module for obtaining display information according to the sound control register value; and
- a display generation module for displaying the display information.

11. The information display device of claim 10, wherein:
the sound information sending module is further configured for:
- obtaining a sound data package according to the acquired sound information, the sound data package comprising the acquired sound information, a device address of a data bus of the sound control register and a register address of the data bus of the sound control register; and
- sending the sound data package to the sound control register through the data bus such that the sound control register value corresponding to the register address is modified.

12. The information display device of claim 11, wherein:
the display processing module is further configured for:
- calling a sound displaying interface information when the sound control register value is changed, wherein the sound displaying interface information comprises a current sound progress bar obtained according to the sound control register value; and
- modifying the sound control register value at the register address.

13. The information display device of claim 11, wherein:
the display processing module is further configured for:
calling a sound displaying interface information when the sound control register value is changed.

14. The information display device of claim 10, wherein:
the information display device further comprises:
- an adjustment information acquiring module for acquiring sound adjusting information inputted by a user; and
- a sound processing register, for obtaining adjusted sound information in which sound volume or sound quantity has been adjusted, by changing a value of the sound processing register according to the sound adjusting information.

15. The information display device of claim 11, wherein:
the information display device further comprises:
- an adjustment information acquiring module for acquiring sound adjusting information inputted by a user; and
- a sound processing register, for obtaining adjusted sound information in which sound volume or sound quantity has been adjusted, by changing a value of the sound processing register according to the sound adjusting information.

16. The information display device of claim 12, wherein:
the information display device further comprises:
- an adjustment information acquiring module for acquiring sound adjusting information inputted by a user; and
- a sound processing register, for obtaining adjusted sound information in which sound volume or sound quantity has been adjusted, by changing a value of the sound processing register according to the sound adjusting information.

17. The information display device of claim 10, wherein:
the information display device further comprises:
- an adjustment information acquiring module for acquiring sound adjusting information inputted by a user; and
- a sound processing register for obtaining adjusted sound information in which sound has been adjusted, by changing a value of the sound processing register according to the sound adjusting information.

18. The information display device of claim 11, wherein:
The field-programmable gate array comprises an inter-integrated circuit, and the data bus comprises an inter-integrated circuit data bus.

19. A display apparatus comprising the information display device according to claim 10.

* * * * *